US006948900B1

(12) United States Patent
Neuman (10) Patent No.: US 6,948,900 B1
(45) Date of Patent: Sep. 27, 2005

(54) FLOW RACK (75) Inventor: Larry D. Neuman, Zeeland, MI (US)

(73) Assignee: Life Time Systems, LLC, Muskegon, MI (US)

( * ) Notice: Subject to any disclaimer, the term of this patent is extended or adjusted under 35 U.S.C. 154(b) by 0 days.

(21) Appl. No.: 10/938,074

(22) Filed: Sep. 10, 2004

(51) Int. Cl.[7] .............................................. B65G 1/00
(52) U.S. Cl. ..................... 414/267; 193/37; 193/35 R; 211/126.9; 211/133.2
(58) Field of Search .................. 414/267, 331.01, 414/331.06; 211/126.9, 126.1, 133.2, 133.5, 211/59.2, 59.3; 193/35 R, 37

(56) References Cited

U.S. PATENT DOCUMENTS

| 1,455,977 A | | 5/1923 | Wentz |
| 2,563,965 A | | 8/1951 | Seed |
| 2,600,747 A | | 6/1952 | Faust |
| 2,793,760 A | * | 5/1957 | Zel et al. ....................... 211/55 |
| 2,891,677 A | * | 6/1959 | Wilbrod ..................... 211/59.2 |
| 3,085,694 A | * | 4/1963 | Jones ........................ 211/134 |
| 3,680,712 A | * | 8/1972 | Jurasek ...................... 211/59.2 |
| 3,840,102 A | | 10/1974 | Dawsom |
| 3,900,112 A | | 8/1975 | Azzi et al |
| 4,136,783 A | * | 1/1979 | Karashima .................. 211/59.2 |
| 4,298,127 A | * | 11/1981 | Upshaw et al. .......... 211/126.9 |
| 4,299,327 A | * | 11/1981 | Thauer ....................... 211/186 |
| 4,372,451 A | | 2/1983 | Rasmussen et al |
| 4,453,641 A | | 6/1984 | Rasmussen et al |
| 4,790,707 A | * | 12/1988 | Magretta et al. ............ 414/276 |
| 4,953,879 A | * | 9/1990 | Cain et al. ............... 280/47.19 |
| 5,361,884 A | | 11/1994 | Yonezawa |
| 5,427,218 A | | 6/1995 | Yonezawa |
| 5,454,460 A | | 10/1995 | Lane |
| 5,474,412 A | | 12/1995 | Pfeiffer et al |
| 5,607,068 A | * | 3/1997 | Coretti et al. .............. 211/59.2 |
| 5,762,177 A | | 6/1998 | Baker et al |
| 6,073,743 A | | 6/2000 | Mefford |

* cited by examiner

Primary Examiner—Richard Ridley
(74) Attorney, Agent, or Firm—Warner Norcross & Judd (57) ABSTRACT

A wire flow rack system including a longitudinal wire, a roller wire, a roller and an optional cap. The roller wire is joined with and transverse to the longitudinal wire and includes an unsupported free end that projects beyond the longitudinal wire. The roller defines an axial bore, and is positioned on the free end so that the it is free to rotate about the roller wire. A end element, for example, a cap, can be joined with the free end to prevent the roller from disengaging the free end. The cap can be friction fit with the free end and easily, manually replaceable relative to the free end, without the use of tools.

20 Claims, 6 Drawing Sheets

FLOW RACK

BACKGROUND OF THE INVENTION

The present invention relates to a flow system, and more particularly to a wire flow rack.

A variety of flow systems exist for handling parts and products in manufacturing, distribution, and retail facilities. Many of these systems transfer items from one location to another under the force of gravity. For example, such systems include inclined shelves having rollers that enable product to be loaded from one side and "flow" via gravity to another side of the system to provide easy access to the product by a laborer or a machine.

One conventional flow rack system, disclosed in U.S. Pat. No. 3,840,102 to Dawson, includes a bed of rollers, with groups of several rollers being supported on a single shaft in spaced apart relation. The shaft is supported on opposite ends, and the middle as well, to add structural support to it when product travels over the rollers.

Although conventional flow rack systems enable the transfer of product from one location to another, they suffer several shortcomings. First, because several rollers are disposed on a single shaft, the replacement of a single, worn-out or damaged roller is tedious. For example, the entire shaft must be removed to access and replace the damaged roller. This consumes man hours for the replacement, and also results in the particular rack system being decommissioned until the roller is replaced. Second, the replacement of the rollers requires the use of one or more tools to loosen the end nuts of the roller shaft. If a roller repairman is not equipped with the appropriate-sized tool, needless repair time may be wasted in finding the correct tool. Third, the shaft is prone to bending and misalignment. For example, because the shaft is supported on opposite ends and in the middle, it may bend between those supported ends under excessive loading of the rollers. Fourth, the frame of conventional systems is usually large and unwieldy, which makes it difficult to reconfigure the frame and to move the rack system.

SUMMARY OF THE INVENTION

The aforementioned problems are overcome in the present invention which provides a wire flow rack system including a longitudinal wire, a roller wire, a roller and an optional roller wire end element. In one aspect, the roller wire is joined with and transverse to the longitudinal wire and includes an unsupported free end that projects beyond the longitudinal wire. The roller defines an axial bore, and is positioned on the free end so that it is free to rotate about the roller wire. An end element, such as a cap, can be joined with the free end to prevent the roller from disengaging the free end of the roller wire.

In a specific aspect, the wire rack includes at least two longitudinal wires separated from one another by a distance. The roller wire can be of a length that is greater than the distance so that first and second free ends project beyond the outside portions of each of the longitudinal wires. Rollers can be positioned on these opposing free ends.

In a more specific aspect, the optional end element can be a cap including a flange that extends outwardly, away from the roller wire. The flange can prevent the roller from disengaging the free end. Optionally, the cap frictionally engages the end and is manually removable, without the aid of tools, from the end.

In an even more specific aspect, the wire rack can include transverse wires joined with and transverse to the longitudinal wires, and interspersed between multiple roller wires. These transverse wires can extend beyond the longitudinal wires and bend upward. To the upward bent portions, bumper wires can be secured to guide articles as they flow over the longitudinal wires and rollers.

The wire flow rack system of the present invention can provide a variety of benefits. First, due to the wire configuration, the rack system is easy to assemble and has only a limited number of replaceable parts, e.g., the rollers. Second, due to the wire rack configuration, the system is manageable and easy to maneuver between different shelving structures. Third, the roller wires of the rack enable easy access to and simple replacement of the rollers. Moreover, due to the manually replaceable nature of the end elements that secure the rollers, the rollers are easily replaceable.

These and other objects, advantages and features of the invention will be more readily understood and appreciated by reference to the detailed description of the invention and the drawings.

DETAILED DESCRIPTION OF THE INVENTION

Figure 1:
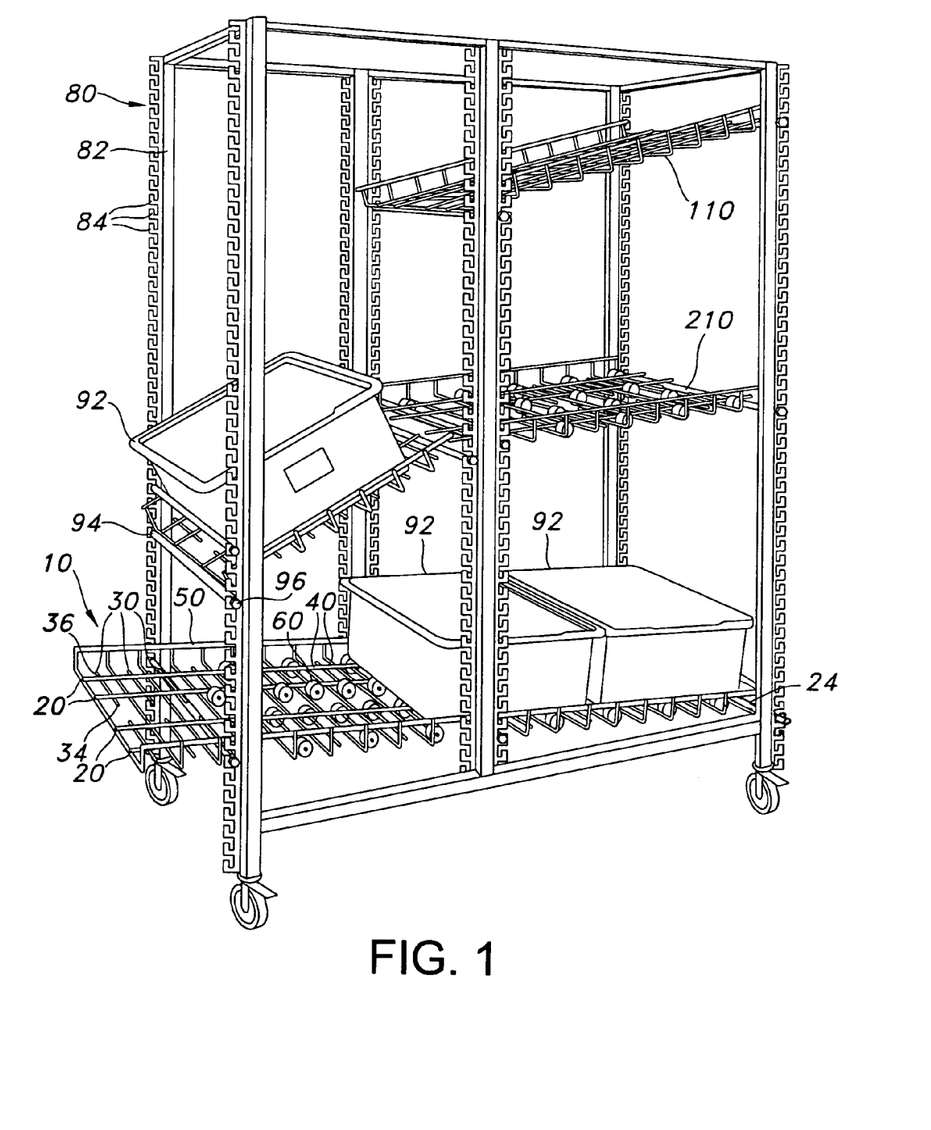
FIG. 1 is a perspective view of a shelving structure including a wire flow rack of the present invention.

A flow rack incorporating a preferred embodiment of the present invention is shown in FIG. 1 and generally designated 10. The flow rack includes longitudinal wires 20, roller wires 30 and rollers 60. Optional transverse wires 40 can include upwardly bent ends that are further joined with optional bumper wires 50. The flow rack 10 is shown in FIG. 1 as being incorporated into a support structure 80, however, it will be appreciated that the flow rack is well suited for a variety of other types of shelving and rack systems.

Other configurations of the flow rack 110 and 210 are also illustrated in FIG. 1, for example, the flow rack 110 illustrates an embodiment of the flow rack in which no rollers are included on the rack. The flow rack 210 illustrates another of the many different configurations of rollers that are possible with the flow rack.

The flow rack 10 can be mounted to the support structure 80 in a variety of configurations, for example, in an inclined configuration so that items 92 can flow via the force of gravity from one side of the support structure 80 to the other. This configuration is helpful in assembly lines to handle products, parts or other items and ensure that the same are readily available on the line.

Figure 2:
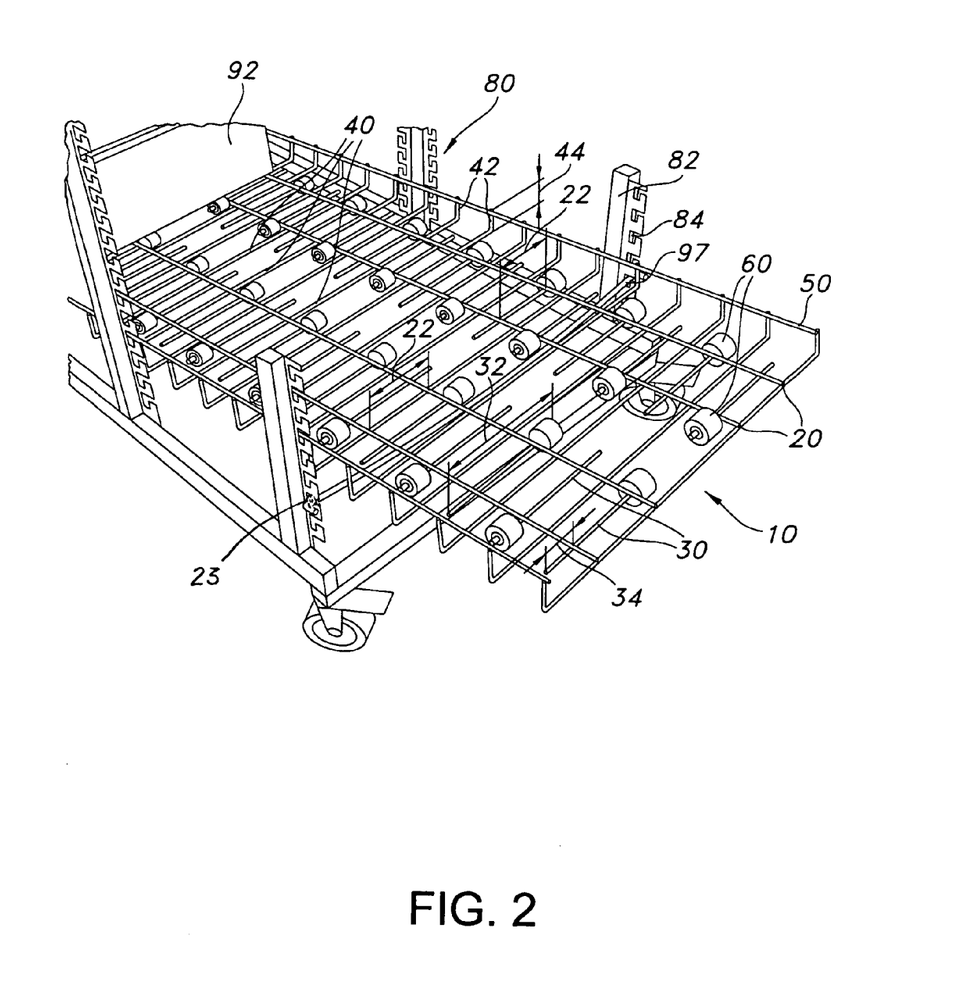
FIG. 2 is a perspective view of the wire flow rack supported on the shelving structure.

In general, the support structure 80 includes multiple vertical support frames 82, which include or define slots 84. At least one end of the flow rack 10 includes a support wire 24 that interfits with the slots 84. To support another portion, for example, another end of the flow rack 10, a support rod 94 can be used. The support rod generally is of the same width as the support structure 80 and spans between opposing vertical support frames 82. The ends of the support rod 84 include threaded holes into which bolts 96 can be secured. These bolts 96 can be sized to fit within the slots 89 or the vertical support structures 82. Accordingly, a user can provide the desired angle of the flow rack 10 relative to horizontal by securing the support wire 24 in a desired slot 84 set, securing the support rod 94 in another desired slot set along the flow rack, and then resting the longitudinal wires 20 and/or other components of the rack on the support rod 94. Alternatively, as shown in FIG. 2, the support rod 94 can be replaced with a separate support wire 97, which includes bent ends that abut against the slot structure when the wire 97 is positioned in the slots 89. Optionally, an elastomeric element 23 can be positioned in the slot 84 within which the wire 97 rests to further secure that wire within the slot. As shown, the elastomeric element is circular, defines an axial hole, and includes an annular grove which enables it to register within the slot. Other shapes and configurations of the elastomeric element can be used as desired; and the elastomeric element can be used to secure other wires of the flow rack in slots as desired.

Further optionally, the support wire 24 may be structurally reinforced with a supplemental wire 25. The supplemental wire can be joined with the support wire 24 along all or a portion of the length of the support wire 25. In one embodiment, the supplemental wire is of a length that enables the support wire 24 to be inserted into slots 84 while the supplemental wire 25 fits between the opposing supports. In this embodiment, the supplemental wire remains outside the slots, but still reinforces that support wire 24. The supplemental wire 25 may be welded or otherwise joined to the support wire using conventional fastening techniques.

Moreover, the flow rack itself can be configured to include multiple support wires 24 along its length to take the place of a support rod 94. Other configurations of fastening systems can be included in the flow rack and/or support structure 80 to achieve the desired configuration.

Figure 3:
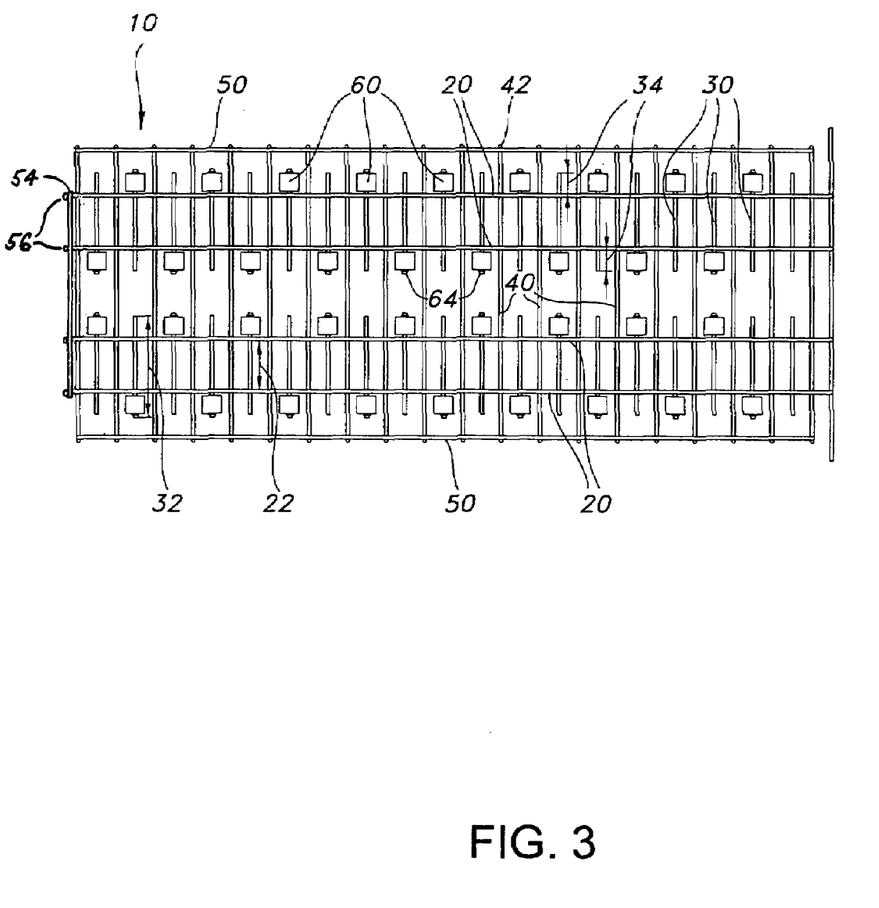
FIG. 3 is a top plan view of the wire flow rack.
Figure 4:
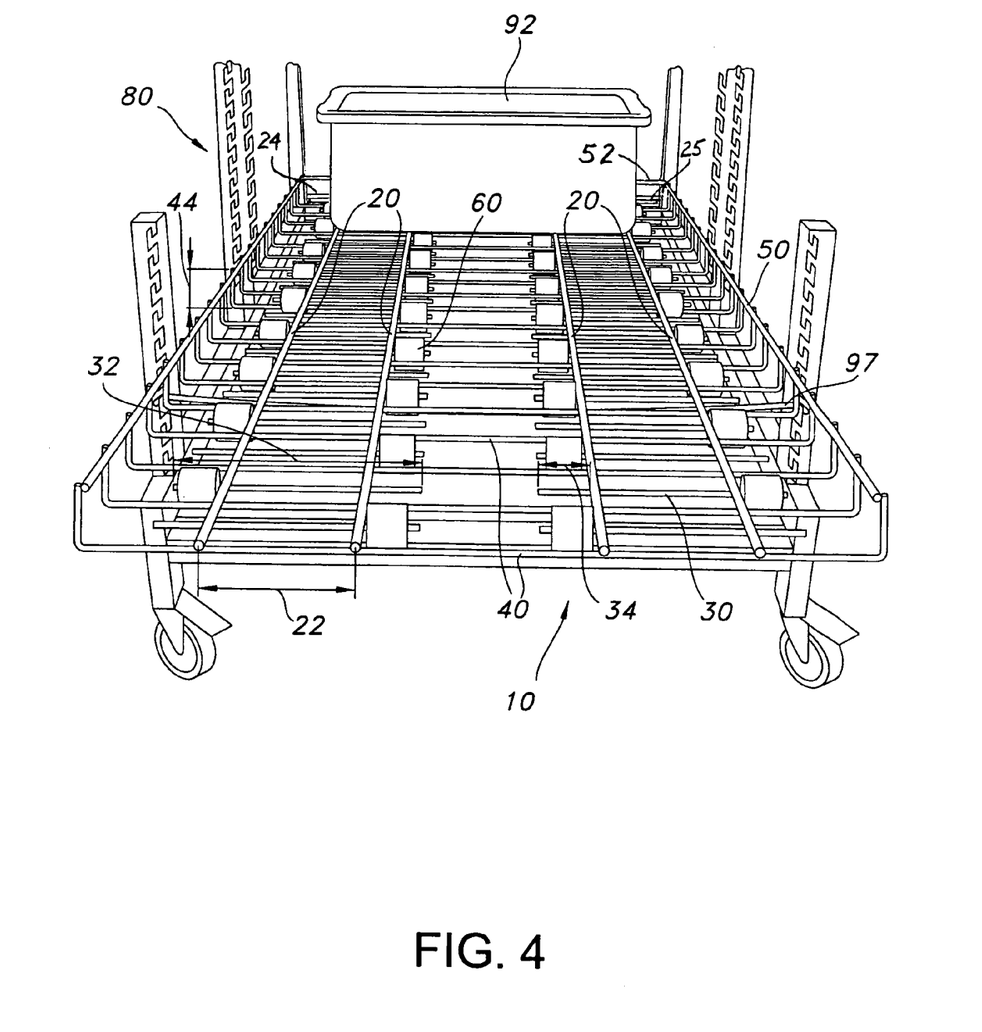
FIG. 4 is an end view of the wire flow rack.

With further reference to FIGS. 2–4, the flow rack includes one or more longitudinal wires 20 that can extend the length of the flow rack, for example, from end to end. The longitudinal wires are spaced apart from one another a distance 22. It will be appreciated that although four longitudinal wires 20 are shown in the drawings, any number may be used, for example one, two four, etc. Positioned along and joined with the longitudinal wires are roller wires 30. These roller wires 30 are joined with and substantially transverse to the longitudinal wires 20. The roller wires can be of a length 32 that is greater than the distance 22 between the longitudinal wires 20 so that at least one of the opposite ends of the roller wires 34 extend beyond the longitudinal wires on the outsides of those longitudinal wires. As used herein, free end means an end of a wire component that projects into space and is unsupported by any other component along that end. The free ends 34 of the roller wire can extend beyond the longitudinal wires 20 any distance, however in some circumstances, the length can be at least about half the width of the rollers 60, as described below, so that the rollers are adequately supported by the roller wire.

The longitudinal wire, roller wire and optional transverse and bumper wires (described below) are constructed from wire. As used herein, wire refers to any slender rod or tubing constructed of metal and/or synthetic materials. The wire components of the flow rack may be of any cross section, including but not limited to, circular, elliptical, triangular and rectangular cross sections. In one embodiment, the wire is of a circular cross section and constructed from a solid piece of steel having a ¼ inch diameter. Other diameters of rods and tubing may be used as well, for example, ⅛, ½, ⅝, 9/16 inch, and greater, diameters. When the wires of the flow rack are constructed from metal, they can be joined by welding the wires together with any conventional welding technique.

As shown in FIGS. 2–4, a roller 60 of the flow rack can be rotatably mounted on the roller axle wires 30 at the free ends 34 of these wires. Due to the ease of installation and replacement, the rollers can be configured relative to the wire rack in a variety of different configurations. For example, the rollers can be mounted on every, or every other, roller wire. Moreover, if an application requires that product move slowly across the flow rack 10, all the rollers 60 can be removed from the flow rack. Generally speaking, the rollers enable items 92 to flow across the plane within which the longitudinal wires 20 and/or other wires, for example, the roller wires 30, are positioned.

The rollers shown in FIG. 2 are generally cylindrical and define an axial cylindrical bore 62. The diameter of this bore 62 can be slightly greater than the diameter of the free end of the roller wire 34 so that when mounted thereon, the roller 60 freely rotates. The rollers can be constructed of any material, such as plastic (e.g. polypropylene, polyethylene, polyurethane, or any polymer), metal, alloys, or other synthetic or natural materials. The rollers also can be of a one-piece, unitary construction, that is, the rollers can be constructed from a single piece of material that has been modified to form various features of the roller. Further, the rollers can be constructed from multiple components, for example, a solid outer roller surface 65 which is joined with a bearing set 67, the bearing set resting on or secured to the free end of the axle wires (FIG. 5).

When mounted on the free end 34 of the roller wire, the roller rotates adjacent the longitudinal wire 20. As desired, an end element 64 can be joined with the roller wire 30 to prevent the roller 60 from disengaging the free end 34. As used herein, a end element means any component, fastener or feature that prevents the roller from sliding off and/or disengaging the wire to which the roller is mounted, and includes, but is not limited to, a cap, a nut, a clamp, and a screw or bolt having a head larger than the wire which is screwed into a hole defined by the wire. Further, a means for preventing the roller from sliding off and/or disengaging the wire includes, but is not limited to, any of the foregoing.

Figure 5:
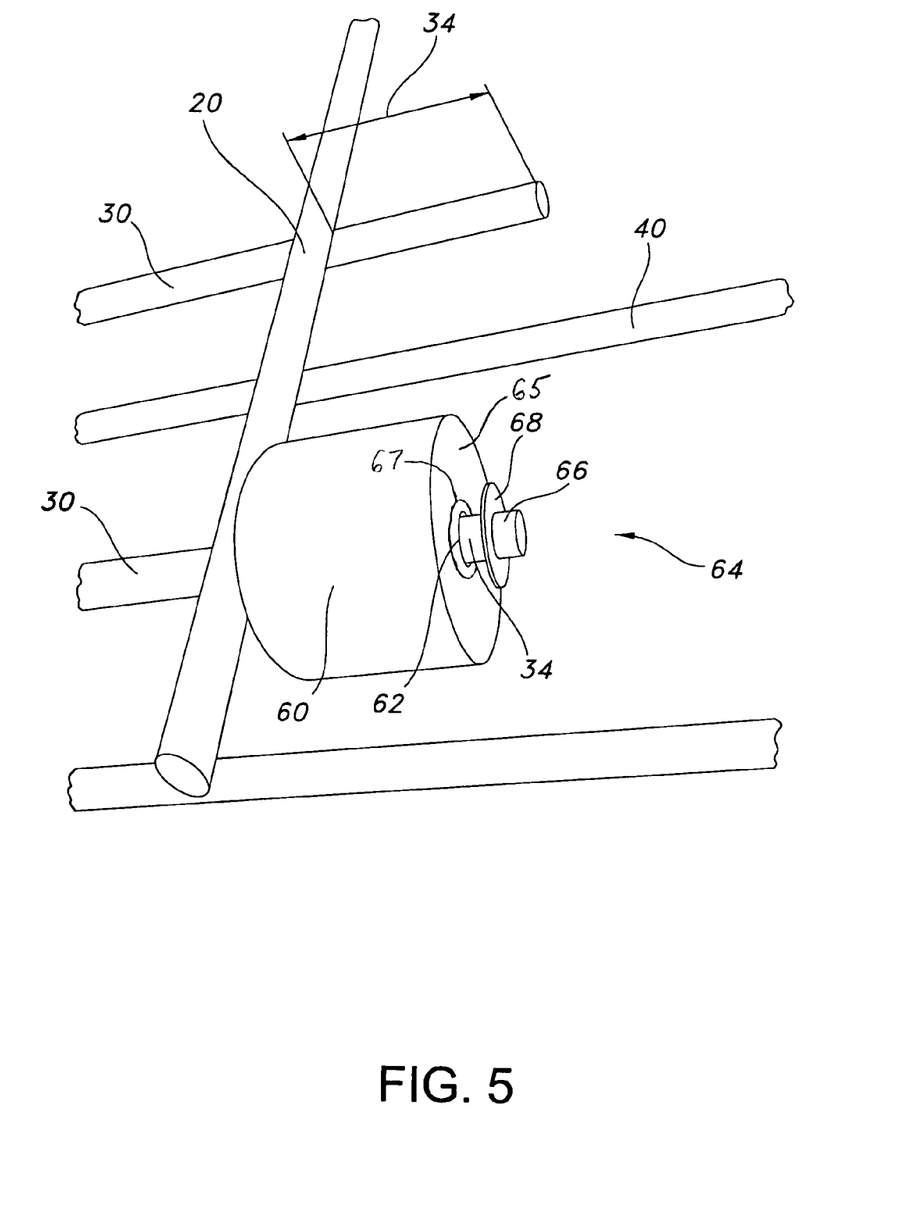
FIG. 5 a perspective view of a roller mounted on the wire flow rack.

As shown in FIG. 5, one type of end element is a cap 64. The cap generally includes a first portion 66 and a flange 68. The first portion defines a cavity having an inner diameter that fits snuggly over the free end 34 of the roller wire. The flange extends radially outward from the cap portion 66. In one embodiment, the cap frictionally engages the free end of the roller wire due to the snug fitting diameter. Of course, other features, such as o-rings or indentations (not shown) can be included in the cap to achieve the friction fit. Further, the end element can be replaceable relative to the roller wire by mere manual manipulation, for example, without the use of any tools.

Figure 6:
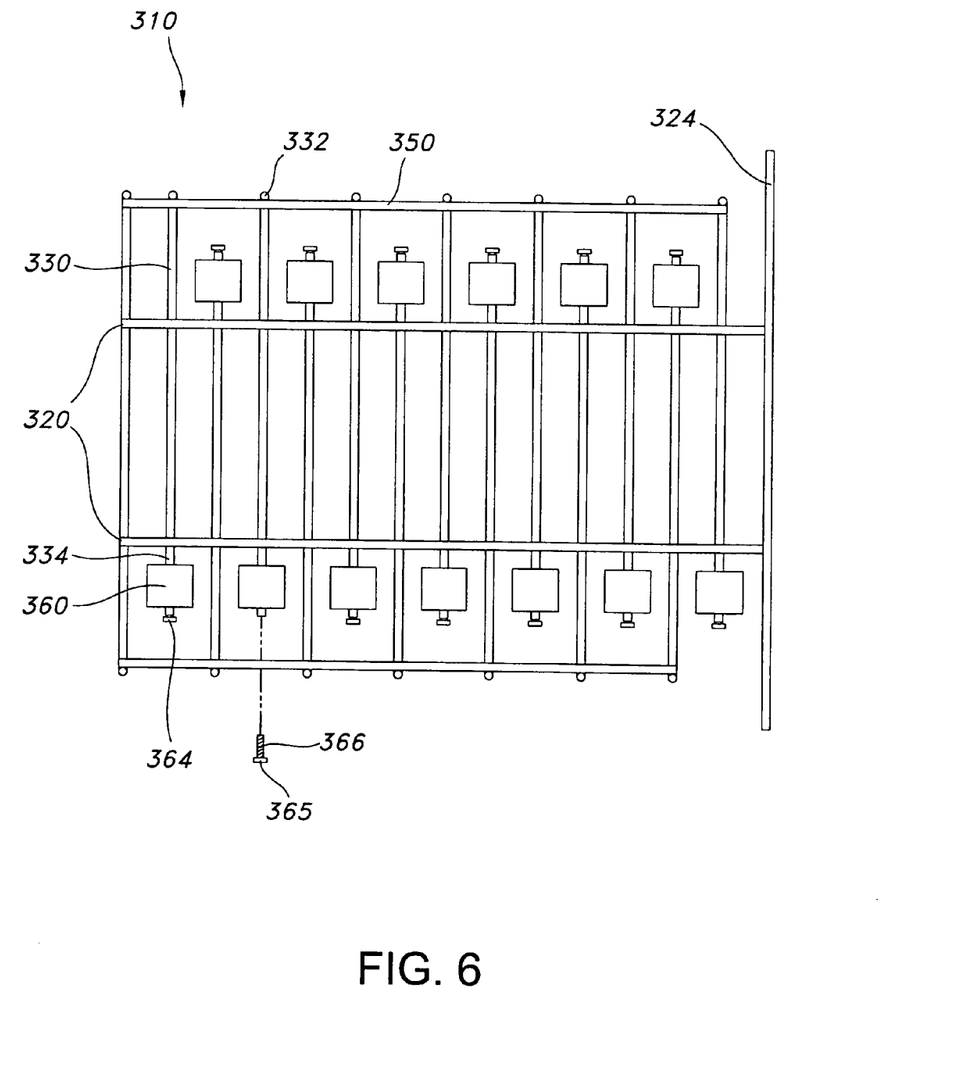
FIG. 6 is a first alternative embodiment of the wire flow rack.

The end element, shown in FIG. 6, also can be a bolt 364 having a head 368 and a threaded portion 366, which is threaded into an internal bore defined by the roller wire 330. The head 368 can be slightly larger than the internal bore of the roller 360 so that the roller 360 cannot disengage a roller wire. A washer can also be associated with the bolt to retain the roller on the roller wire.

As shown in FIGS. 2–4, the flow rack 10 can also include transverse wires 40. These transverse wires can be joined with and substantially transversed to the longitudinal wires 20. These wires can also be of a length that is greater than the distance 22 between one or more longitudinal wires and/or sets of longitudinal wires so that opposite ends of the transverse wires extend beyond such longitudinal wires. The portion of the transverse wire 40 that extends beyond the longitudinal wire, for example transverse wire end 42, may be bent upwardly, for example, bent substantially vertical to the plane defined by the longitudinal wires 20.

To the ends of the upwardly extending portions 44 of the transverse wires, one or more bumper wires 50 can be secured. These bumper wires can be generally substantially parallel to the longitudinal wires 20 and positioned a preselected distance above the plane defined by those longitudinal wires 20. These bumper wires 50 can form a boundary to guide items 92 in flowing over the rollers 60. Optionally, one or more end bumper wires 52 (FIG. 4) can be joined with the side bumper wires 50 and/or the transverse wires 40. These end bumper wires 52 can extend across all or a portion of the width of the flow rack 10, and operate as a stop for articles 92 on the rack.

Further optionally, the flow rack can include one or more stop wires 54 as shown in FIG. 3. The stop wire 54 can be secured to the ends 56 of the longitudinal wires 20, which are upwardly turned relative to the remainder of the longitudinal wires. The stop wire 54 is positioned inward relative to the ends 56 of the longitudinal wires 20; however, the stop wire 54 may be positioned outward relative to the ends 56, i.e., positioned on the outside of the ends 56 as desired. The stop wire 54 can operate to stop articles from rolling or sliding off the end of the flow rack when the rack is used in a gravity flow capacity.

The number and sequence of the roller wires 30 and transverse wires 40 included in the flow rack 10 can be varied as desired. For example, the sequence can be transverse wire, roller wire, transverse wire; transverse wire, roller wire, roller wire, transverse wire; transverse wire; roller wire, transverse wire, transverse wire, etc., as desired. Additional transverse wires 40 may be added to increase the structural rigidity of the flow rack 10. Likewise, additional longitudinal wires 20 may be added for the same purpose. Where a roller wire is disposed between two transverse wires, the distance between the transverse wires can be significant enough to allow clearance for the roller 60 on the roller wire to freely rotate. Where the roller wire 30 is in the same plane as the transverse wires, this distance can be greater than the diameter of the roller.

FIG. 6 illustrates an alternative embodiment of the wire flow rack 310. This embodiment includes longitudinal wires 320 to which roller wires 330 are joined. In addition to having free ends 334 to which rollers 360 are rotatably mounted, the roller wires also include another end extending beyond the longitudinal wire, opposite the roller, that roller wire end being bent upwardly to form an upwardly bent portion 332. To this upwardly bent portion 332, a bumper wire 350 can be secured. In this alternative embodiment, the transverse wires described above in connection with the other embodiment can be eliminated because the roller wires provide the structure to which the bumper wires 350 can be secured. This alternative embodiment may also include a support wire 324 which can be used to mount the flow rack 310 to a support structure as described in the embodiment above.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. A wire flow rack system for handling articles comprising:
   at least two substantially parallel longitudinal wires separated from one another by a first distance and lying in a first plane over which the articles flow;
   at least two substantially parallel transverse wires joined with and transverse to the at least two longitudinal wires, each of the transverse wires of a first length that is greater than the first distance so that the transverse wires extend beyond the at least two longitudinal wires, at least one of the transverse wires bent upward relative to the first plane beyond at least one of the at least two longitudinal wires to form an upwardly extending transverse wire portion;
   a bumper wire joined with the upwardly extending transverse wire portion, the bumper wire extending substantially parallel to the longitudinal wires, whereby the bumper wire forms a boundary for guiding the articles over the first plane;
   a roller wire joined with and transverse to the at least two longitudinal wires, the roller wire positioned between the at least two transverse wires, the roller wire extending beyond at least one of the two longitudinal wires to form a first free end of a second length;
   a one-piece plastic roller of a generally cylindrical shape, having a width, and defining an axial bore, the roller rotatably mounted to the first free end by positioning the axial bore over the first free end of the roller wire, the second length being greater than the roller width so that a first free end portion extends beyond the roller, whereby the roller provides a rolling surface over which the articles flow; and
   a cap including a flange, the cap substantially only frictionally engaging the first free end portion, whereby the cap is manually removable from the first free end portion, wherein the flange is adapted prevent the roller from disengaging the first free end of the roller wire.

2. The wire flow rack system of claim 1 wherein the roller is constructed from substantially only at least one of polyurethane, polyethylene, and polypropylene.

3. The wire flow rack system of claim 1 wherein the roller wire is of third length that is greater than the first distance so that the roller wire extends beyond both of the at least two longitudinal wires to form a second free end opposite the first free end, the second free end of a fourth length, wherein another roller is rotatably mounted to the second free end.

4. The wire flow rack system of claim 3 wherein including a plurality of roller wires, wherein the roller wires and transverse wires are in alternating sequence.

5. The wire flow rack system of claim 1 wherein the cap includes a first portion sized to frictionally fit over the first free end.

6. The wire flow rack system of claim 5 wherein the cap includes a flange extending radially outward around at least part of the first portion.

7. A wire rack system for handling articles comprising:
   a longitudinal wire;
   a roller wire transverse to and fixedly joined with the longitudinal wire, the roller wire extending beyond the longitudinal wire to form a first free end of a first length;

a bumper wire coupled to and aligned with the longitudinal wire, the bumper wire forming a boundary that guides the articles generally over the longitudinal wire;

a roller of a generally cylindrical shape, having a width, and defining an axial bore, the axial bore positioned over the first free end of the roller wire so that the roller is free to rotate on the free end, wherein the roller wire first length is at least about half as great as the roller width, wherein the roller provides a rolling surface over which the articles flow; and means for preventing the roller from disengaging the first free end of the roller wire, the preventing means manually removable from the first free end.

8. The wire rack system of claim 7 wherein the roller wire includes a second end extending beyond the first free end on an opposite side of the longitudinal wire, the roller wire bent upward near the second end.

9. The wire rack system of claim 8 wherein the bumper wire is joined with the roller wire at the second end of the roller wire.

10. The wire rack system of claim 9 comprising a plurality of transverse wires, each transverse to the longitudinal wire, wherein the roller wire is disposed between at least two transverse wires.

11. The wire rack system of claim 7 wherein the preventing means is a cap including a flange, the cap secured to the first free end substantially only via a friction fit with the first free end.

12. The wire rack system of claim 7 wherein the roller is a one-piece construction formed from at least one of polyurethane, polyethylene, and polypropylene.

13. The wire rack system of claim 7 wherein the longitudinal wire, the roller wire and the bumper wire are formed from solid, cylindrical rods of metal.

14. A wire rack comprising:
a longitudinal wire;
a transverse wire joined with and transverse to the longitudinal wire;
a roller wire joined with and transverse to the longitudinal wire, the roller wire adjacent the transverse wire, the roller wire including an unsupported free end that projects beyond the longitudinal wire;
a roller defining an axial bore, the roller positioned on the free end so that the free end is at least partially inserted in the axial bore; and
an end element replaceably joined with the free end to prevent the roller from disengaging the first free end of the roller wire, wherein the roller is free to rotate about the free end between the longitudinal wire and the end element.

15. The wire rack system of claim 14 wherein the end element is secured to the free end substantially only via a friction fit with the free end.

16. The wire rack system of claim 14 wherein the end element is a cap including a first portion defining an aperture and a flange.

17. The wire rack system of claim 14 wherein the roller wire free end defines a hole, wherein the end element is a fastener threaded into the hole, the fastener including a head of a size greater than the axial bore.

18. The wire rack system of claim 14 comprising a bumper wire joined with at least one of the transverse wire and the roller wire, the at least one of the transverse wire and the roller wire being substantially parallel to the longitudinal wire.

19. The wire rack system of claim 14 comprising a bearing within the axial bore, the bearing engaging the free end so that the roller rolls.

20. The wire rack system of claim 19 wherein the transverse wire is upwardly bent to form an upwardly projecting portion and the bumper wire is joined with the upwardly projecting portion.

* * * * *